(12) United States Patent
Fang et al.

(10) Patent No.: US 11,172,472 B2
(45) Date of Patent: Nov. 9, 2021

(54) RESOURCE ALLOCATION METHOD, DEVICE, AND STORAGE MEDIUM

(71) Applicant: XI'AN ZHONGXING NEW SOFTWARE CO., LTD., Shaanxi (CN)

(72) Inventors: Huiying Fang, Shenzhen (CN); Bo Dai, Shenzhen (CN); Weiwei Yang, Shenzhen (CN); Xianming Chen, Shenzhen (CN); Kun Liu, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 35 days.

(21) Appl. No.: 16/610,305

(22) PCT Filed: Apr. 25, 2018

(86) PCT No.: PCT/CN2018/084442
§ 371 (c)(1),
(2) Date: Nov. 1, 2019

(87) PCT Pub. No.: WO2018/201947
PCT Pub. Date: Nov. 8, 2018

(65) Prior Publication Data
US 2020/0154429 A1 May 14, 2020

(30) Foreign Application Priority Data
May 5, 2017 (CN) .......................... 201710312038.6

(51) Int. Cl.
*H04W 4/00* (2018.01)
*H04W 72/04* (2009.01)
(Continued)

(52) U.S. Cl.
CPC ......... *H04W 72/0413* (2013.01); *H04W 4/70* (2018.02); *H04W 4/80* (2018.02); *H04W 72/0453* (2013.01)

(58) Field of Classification Search
CPC ......... H04W 4/70; H04W 4/80; H04W 72/00; H04W 72/0413; H04W 72/0453; H04W 72/1278; H04W 72/14
See application file for complete search history.

(56) References Cited

U.S. PATENT DOCUMENTS

| 2016/0088594 A1 | 3/2016 | Xiong |
| 2017/0272287 A1* | 9/2017 | Shen ................. H04L 5/0048 |
| 2019/0081743 A1* | 3/2019 | Loehr ................ H04L 1/1887 |

FOREIGN PATENT DOCUMENTS

| CN | 103069763 A | 4/2013 |
| WO | 2016161630 A1 | 10/2016 |

OTHER PUBLICATIONS

International Search Report for corresponding application PCT/CN2018/084442 filed Apr. 25, 2018; dated Jul. 6, 2018.

* cited by examiner

*Primary Examiner* — Matthew W Genack
(74) *Attorney, Agent, or Firm* — Cantor Colburn LLP

(57) ABSTRACT

Provided are a resource allocation method and device, and a storage medium. The method includes: configuring resources for transmission of a physical uplink shared channel of a terminal by means of an uplink resource allocation parameter; and transmitting the uplink resource allocation parameter to the terminal. By means of the method, the device and the storage medium of the present disclosure, a base station configures, through the uplink resource allocation parameter, resources for the transmission of the physical uplink shared channel of the terminal and transmits the uplink resource allocation parameter to the terminal, thus (Continued)

solving the problem in the related art the minimum resource allocation granularity in resource allocation for the PUSCH can only be one physical resource block, and reducing the resource allocation granularity.

19 Claims, 4 Drawing Sheets

(51) Int. Cl.
*H04W 4/70* (2018.01)
*H04W 4/80* (2018.01)

RESOURCE ALLOCATION METHOD, DEVICE, AND STORAGE MEDIUM

CROSS REFERENCE TO RELATED APPLICATIONS

This is a U.S. National Stage Application, filed under 35 U.S.C. 371, of International Patent Application No. PCT/CN2018/084442, filed on Apr. 25, 2018, which claims priority to Chinese patent application No. 201710312038.6 filed on May 5, 2017, contents of both of which are incorporated herein by reference in their entireties.

TECHNICAL FIELD

The present disclosure relates to the field of communications and in particular, to a resource allocation method, a resource allocation device and a storage medium.

BACKGROUND

Machine Type Communications (MTC), also referred to as Machine to Machine (M2M) communications, is the mainstream application mode of the Internet of Things in the current stage. Currently, MTC devices on the market are mainly based on the global system of mobile communication (GSM). In recent years, more and more mobile operators have chosen Long Term Evolution/Advanced Long-Term Evolution (LTE/LTE-A) as the evolution direction of the future broadband wireless communication system due to the high spectral efficiency of the LTE/LTE-A. Various MTC data traffic based on the LTE/LTE-A will also be more attractive.

A minimum resource allocation granularity in the resource allocation for a physical uplink shared channel (PUSCH) of the existing MTC terminal (Rel-13 MTC terminal) is one physical resource block (PRB), and overhead of an uplink resource allocation field in a coverage enhancement mode A (CE mode A) is $$\left\lceil \log_2\left(\left\lfloor \frac{N_{RB}^{UL}}{6} \right\rfloor\right) \right\rceil + 5 \text{ bits.}$$

In each physical channel supporting the MTC traffic, the physical uplink shared channel is a bottleneck of the coverage. To improve the coverage performance and spectrum efficiency of the uplink shared channel, supporting a smaller resource allocation granularity is considered. At present, no effective solution has been proposed to solve the resource allocation problem with smaller resource allocation granularity for the PUSCH of the MTC.

SUMMARY

To overcome the above defects, the present disclosure provides a resource allocation method and device, and a storage medium for solving resource allocation problem using a smaller resource allocation granularity in machine type communications (MTC).

To solve the above technical problem, the present disclosure provides a resource allocation method. The method includes: configuring, through an uplink resource allocation parameter, resources for transmission of a physical uplink shared channel of a terminal; and transmitting the uplink resource allocation parameter to the terminal. The uplink resource allocation parameter includes at least one of: a narrowband index, a physical resource block index, a sub-carrier index, or a number of time domain expansions of an uplink resource unit.

To solve the above technical problems, the present disclosure provides a resource allocation device. The device includes a memory and a processor. The memory stores resource allocation programs, the processor executes the resource allocation programs to implement the following steps: configuring, through an uplink resource allocation parameter, resources for transmission of a physical uplink shared channel of a terminal; and transmitting the uplink resource allocation parameter to the terminal. The uplink resource allocation parameter includes at least one of: a narrowband index, a physical resource block index, a sub-carrier index, or a number of time domain expansions of an uplink resource unit.

To solve the above technical problems, the present disclosure provides a computer-readable storage medium. The computer-readable storage medium stores resource allocation programs which, when executed by at least one processor, cause the at least one processor to execute the resource allocation method described above.

The present disclosure has the following beneficial effects.

Through the method, device and the storage medium in the present disclosure, the base station configures, through the uplink resource allocation parameter, resources for the transmission of the physical uplink shared channel of the terminal, and transmits the uplink resource allocation parameter to the terminal, such that the problem in the related art that the resource allocation for the PUSCH can only be performed with a minimum resource allocation granularity of one physical resource block is solved, thereby reducing the resource allocation granularity. Therefore, the MTC terminal can transmit the PUSCH with lager power, spectrum efficiency is further expanded, and coverage performance of the PUSCH of the MTC terminal is improved.

DETAILED DESCRIPTION

To solve the problems in the existing art, the present disclosure provides a resource allocation method, a resource allocation device, and a storage medium. The present disclosure will be further described in detail in connection with embodiments and drawings. It is to be understood that the embodiments described herein are intended to explain and not to limit the present disclosure.

Embodiment One

Figure 1:
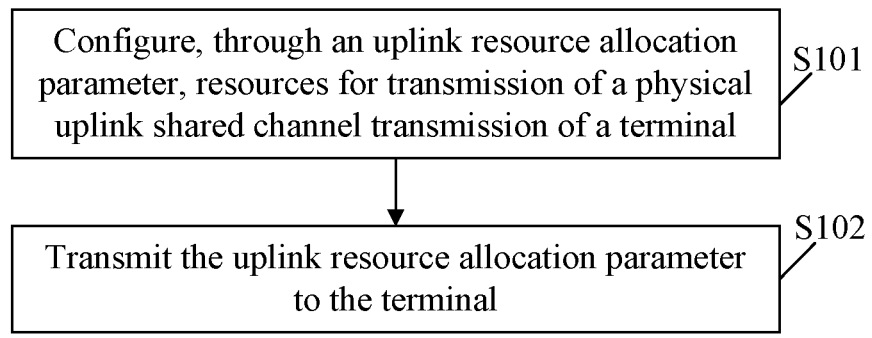
FIG. 1 is a main flowchart of a resource allocation method according to an embodiment of the present disclosure.

As shown in FIG. 1, an embodiment of the present disclosure provides a resource allocation method, including steps described below.

In S101, resources for transmission of a physical uplink shared channel of a terminal are configured through an uplink resource allocation parameter.

In S102, the uplink resource allocation parameter is transmitted to the terminal, where the uplink resource allocation parameter includes at least one of: a narrowband index, a physical resource block index, a subcarrier index, or a number of time domain expansions of an uplink resource unit.

Through the embodiment of the present disclosure, a base station configures, in the uplink resource allocation parameter, resources for the transmission of the physical uplink shared channel of the terminal, and transmits the uplink resource allocation parameter to the terminal, such that the problem in the related art that the resource allocation for the PUSCH can only be performed with a minimum resource allocation granularity of one physical resource block is solved, thereby reducing the resource allocation granularity. Therefore, the MTC terminal can transmit the PUSCH with lager power, spectrum efficiency is further expanded, and coverage performance of the PUSCH of the MTC terminal is improved.

Specifically, the base station transmits the resource allocation parameter to the terminal through signaling. For example, the base station transmits the resource allocation parameter to the terminal through higher-layer signaling and/or downlink control information (DCI).

In one specific implementation of the embodiment of the present disclosure, alternatively, the step of configuring resources for transmission of the physical uplink shared channel of the terminal through the uplink resource allocation parameter at least includes one of the following features:

identifying narrowband position information of the configured resources through the narrowband index;

identifying information of a physical resource block of the configured resources through the physical resource block index; or identifying a frequency domain subcarrier position of the uplink resource unit in a physical resource unit through the subcarrier index.

The narrowband is composed of 6 consecutive physical resource blocks, each of which includes 12 consecutive subcarriers in a frequency domain.

Optionally, the method further includes: indicating the narrowband index through $$\left\lceil \log_2\left(\left\lfloor \frac{N_{RB}^{UL}}{6} \right\rfloor\right) \right\rceil,$$

where $N_{RB}^{UL}$ denotes a number of uplink physical resource blocks.

Optionally, the uplink resource unit is at least one of: a single subcarrier resource unit, a 2-subcarrier resource unit, a 3 subcarrier-resource unit, a 4-subcarrier resource unit, a 6-subcarrier resource unit, a 9-subcarrier resource unit, or a full subcarrier resource unit.

Further, in response to the uplink resource unit including less than 12 subcarriers in the frequency domain, a number of uplink resource units in a time domain is indicated through the number of time domain expansions of the uplink resource unit.

The implementation mode is described in detail.

The narrowband index is used for identifying the narrowband position information of the allocated resource. The narrowband includes six consecutive physical resource blocks (PRBs).

Further, the narrowband index is indicated through $$\left\lceil \log_2\left(\left\lfloor \frac{N_{RB}^{UL}}{6} \right\rfloor\right) \right\rceil \text{ bits.}$$

The resource block index is used for identifying the information of the physical resource block in which the allocated resource is located. For a PUSCH with a subcarrier spacing of 15 kHz, each physical resource block includes 12 consecutive subcarriers in the frequency domain.

The subcarrier index is used for identifying a frequency domain subcarrier position of the uplink resource unit in the physical resource unit. Further, the uplink resource unit may be one or more of the following configurations.

The uplink resource unit includes one subcarrier in the frequency domain, and is referred to as the single subcarrier resource unit.

The uplink resource unit includes two consecutive subcarriers in the frequency domain, and is referred to as the 2-subcarrier resource unit.

The uplink resource unit includes three consecutive subcarriers in the frequency domain, and is referred to as the 3-subcarrier resource unit.

The uplink resource unit includes four consecutive subcarriers in the frequency domain, and is referred to as the 4-subcarrier resource unit.

The uplink resource unit includes six subcarriers in the frequency domain, and is referred to as the 6-subcarrier resource unit.

The uplink resource unit includes nine consecutive subcarriers in the frequency domain, and is referred to as the 9-subcarrier resource unit.

The uplink resource unit includes 12 consecutive subcarriers in the frequency domain, and is referred to as the full subcarrier resource unit.

In another specific implementation of the embodiment of the present disclosure, when the uplink resource allocation parameter indicates a subcarrier-level resource allocation in the physical resource block and/or a physical-resource-block-level resource allocation in the narrowband, the uplink resource allocation parameter includes part or all of the following parameters: a narrowband index, a physical resource block index, a subcarrier index, and a number of time domain expansions of an uplink resource unit. Indication may be implemented in one of five different modes.

Optionally, configuring resources for the transmission of the physical uplink shared channel of the terminal through an uplink resource allocation parameter includes: in an allocation mode having a smaller uplink resource allocation granularity, indicating, through the uplink resource allocation parameter, a subcarrier-level resource allocation in the physical resource block and/or a physical-resource-block-level resource allocation in the narrowband in the transmission of the physical uplink shared channel of the terminal; where the allocation mode having a smaller uplink resource allocation granularity is an allocation mode whose resource allocation granularity is less than one physical resource block.

That is, the base station configures, through user-specific RRC signaling, the terminal to work in the allocation mode having a smaller uplink resource allocation granularity. In the allocation mode having a smaller uplink resource allocation granularity, the terminal acquires uplink resources according to the uplink resource allocation parameter.

Optionally, each of the physical resource block index and the subcarrier index is indicated through 3 bits. The number of time domain expansions of the uplink resource unit is indicated through 2 or 3 bits.

Specifically, the indication of the physical resource block index and the subcarrier index through 3 bits includes: in response to the physical resource block index values being 0 to 5, these physical resource block index values respectively identify physical resource blocks 0 to 5 in the narrowband; in response to the physical resource block index values being 6 and 7, the indication is implemented in any one of manners.

In manner one, in response to the physical resource block index value being 6, the physical resource block index value identifies first 4 physical resource blocks in an allocated narrowband; in response to the physical resource block index value being 7, the physical resource block index value identifies all 6 physical resource blocks in the allocated narrowband.

In manner two, in response to the physical resource block index value being 6, each of subcarrier index values 0 to 4 identifies two consecutive physical resource blocks, each of subcarrier index values 5 to 7 identifies three consecutive physical resource blocks; in response to the physical resource block index value being 7, the subcarrier index value 0 identifies three consecutive physical resource blocks in the narrowband, each of the subcarrier index values 1 to 3 identifies four consecutive physical resource blocks in the narrowband, each of the subcarrier index values 4 to 5 identifies five consecutive physical resource blocks in the narrowband, and the subcarrier index value 6 identifies six consecutive physical resource blocks in the narrowband.

In manner three, in response to the physical resource block index value being 6, each of the subcarrier index values 0 to 2 identifies two consecutive physical resource blocks in the narrowband, each of the subcarrier index values 3 to 4 identifies three consecutive physical resource blocks in the narrowband, the subcarrier index value 5 identifies four consecutive physical resource blocks in the narrowband, the subcarrier index value 6 identifies 6 consecutive physical resource blocks in the narrowband; and in response to the physical resource block index value being 7, the corresponding indication is configured to be a reserved state.

In manner four: in response to the physical resource block index values being 6 to 7, they are configured to be the reserved state.

In manner five: in response to the physical resource block index value being 6, consecutive resource allocation in the narrowband is indicated through the subcarrier index and the number of time domain expansions of the uplink resource unit where the allocated consecutive resource includes 1 to 6 physical resource blocks; and in response to the physical resource block index value being 7, it is configured to be the reserved state.

Further, in the manner two, in response to the physical resource block index value being 6, the subcarrier index value 0 identifies two consecutive physical resource blocks starting from the physical resource block #0 in the narrowband, the subcarrier index value 1 identifies two consecutive physical resource blocks starting from the physical resource block #1 in the narrowband, the subcarrier index value 2 identifies two consecutive physical resource blocks starting from the physical resource block #2 in the narrowband, the subcarrier index value 3 identifies two consecutive physical resource blocks starting from the physical resource block #3 in the narrowband, the subcarrier index value 4 identifies two consecutive physical resource blocks starting from the physical resource block #4 in the narrowband, the subcarrier index value 5 identifies three consecutive physical resource blocks starting from the physical resource block #0 in the narrowband, the subcarrier index value 6 identifies three consecutive physical resource blocks starting from the physical resource block #1 in the narrowband, and the subcarrier index value 7 identifies three consecutive physical resource blocks starting from the physical resource block #2 in the narrowband.

Further, in response to the physical resource block index value being 7, the subcarrier index value 0 identifies three consecutive physical resource blocks starting from the physical resource block #3 in the narrowband, the subcarrier index value 1 identifies four consecutive physical resource blocks starting from the physical resource block #0 in the narrowband, the subcarrier index value 2 identifies four consecutive physical resource blocks starting from the physical resource block #1 in the narrowband, the subcarrier index value 3 identifies four consecutive physical resource blocks starting from the physical resource block #2 in the narrowband, the subcarrier index value 4 identifies five consecutive physical resource blocks starting from the physical resource block #0 in the narrowband, the subcarrier index value 5 identifies five consecutive physical resource blocks starting from the physical resource block #1 in the narrowband, and the subcarrier index value 6 identifies six consecutive physical resource blocks starting from the physical resource block #0 in the narrowband.

In the manner three, the subcarrier index value 0 identifies two consecutive physical resource blocks starting from the physical resource block #0 in the narrowband, the subcarrier index value 1 identifies two consecutive physical resource blocks starting from the physical resource block #2 in the narrowband, the subcarrier index value 2 identifies two consecutive physical resource blocks starting from the physical resource block #4 in the narrowband, the subcarrier index value 3 identifies three consecutive physical resource blocks starting from the physical resource block #0 in the narrowband, the subcarrier index value 4 identifies three consecutive physical resource blocks starting from the physical resource block #3 in the narrowband, the subcarrier index value 5 identifies four consecutive physical resource blocks starting from the physical resource block #0 in the narrowband, and the subcarrier index value 6 identifies six consecutive physical resource blocks starting from the physical resource block #0 in the narrowband.

The scheme that in response to the physical resource block index values being 0 to 5, these physical resource block index values respectively identify the physical resource blocks 0 to 5 in the narrowband is as follows.

The subcarrier index values 0 to 3 respectively indicate: a 3-subcarrier resource unit whose start position is at the subcarrier #0, a 3-subcarrier resource unit whose start position is the subcarrier #3, a 3-subcarrier resource unit whose start position is the subcarrier #6, and a 3-subcarrier resource unit whose start position is the subcarrier #9. The subcarrier index values 4 to 6 respectively indicate: a 6-subcarrier resource unit whose start position is the subcarrier #0, a 6-subcarrier resource unit whose start position is the subcarrier #3, and a 6-subcarrier resource unit whose start position is the subcarrier #6. The subcarrier index value 7 indicates a full subcarrier resource unit whose start position is the subcarrier #0.

Alternatively, the subcarrier index value 4 indicates a 6-subcarrier resource unit whose start position is the subcarrier #0, the subcarrier index value 5 indicates a 6-subcarrier resource unit whose start position is the subcarrier #6, and the subcarrier index value 6 indicates a full subcarrier resource unit whose start position is the subcarrier #0.

In example 1, the physical resource block index values 0 to 5 respectively identify the physical resource block #0 to the physical resource block #5 in the narrowband.

In response to the physical resource block index values being 0 to 5, the subcarrier index values 0 to 3 respectively indicate: a 3-subcarrier resource unit whose start position is at the subcarrier #0, a 3-subcarrier resource unit whose start position is at the subcarrier #3, a 3-subcarrier resource unit whose start position is at the subcarrier #6, and a 3-subcarrier resource unit whose start position is at the subcarrier #9.

In response to the physical resource block index values being 0 to 5, the subcarrier index values 4 to 6 respectively indicate: a 6-subcarrier resource unit whose start position is at the subcarrier #0, a 6-subcarrier resource unit whose start position is at the subcarrier #3, and a 6-subcarrier resource unit whose start position is at the subcarrier #6; and the subcarrier index value 7 indicates a full subcarrier resource unit whose start position is the subcarrier #0. Alternatively, in response to the physical resource block index values being 0 to 5, the subcarrier index values 4 and 5 respectively indicate: a 6-subcarrier resource unit whose start position is the subcarrier #0 and a 6-subcarrier resource unit whose start position is the subcarrier #6; and the subcarrier index value 6 indicates a full subcarrier resource unit staring from the subcarrier #0.

In response to the physical resource block index values being 0 to 5, the number of time domain expansions of the uplink resource unit indicates a number of the 3-subcarrier resource units and 6-subcarrier resource units in the time domain.

The physical resource block index value 6 identifies first four physical resource blocks in the narrowband, i.e., the resource blocks #0, #1, #2 and #3.

The physical resource block index value 7 identifies all 6 physical resource blocks in the allocated narrowband; and the physical resource block index values 0 to 5 respectively identify the physical resource block #0 to the physical resource block #5 in the narrowband.

In example 2, in response to the physical resource block index values being 0 to 5, the subcarrier index value 0 indicates a 3-subcarrier resource unit whose start position is subcarrier #0, the subcarrier index value 1 indicates a 3-subcarrier resource unit whose start position is subcarrier #3, the subcarrier index value 2 indicates a 3-subcarrier resource unit whose start position is subcarrier #6, and the subcarrier index value 3 indicates a 3-subcarrier resource unit whose start position is subcarrier #9.

In response to the physical resource block index values being 0 to 5, the subcarrier index value 4 indicates a 6-subcarrier resource unit whose start position is subcarrier #0, the subcarrier index value 5 indicates a 6-subcarrier resource unit whose start position is subcarrier #3, and the subcarrier index value 6 indicates a 6-subcarrier resource unit whose start position is subcarrier #6, and the subcarrier index value 6 indicates a full subcarrier resource unit whose start position is subcarrier #0. Alternatively, in response to the physical resource block index value being 0 to 5, the subcarrier index value 4 indicates a 6-subcarrier resource unit whose start position is subcarrier #0, the subcarrier index value 5 indicates a 6-subcarrier resource unit whose start position is subcarrier #6, and the subcarrier index value 6 indicates a full subcarrier resource unit whose start position is subcarrier #0.

In response to the physical resource block index value being 0 to 5, the number of time domain expansions of the uplink resource unit indicates a number of 3-subcarrier resource units and 6-subcarrier resource units in the time domain.

In response to the physical resource block index value being 6, the subcarrier index value 0 identities two consecutive PRBs with the start PRB being PRB #0 in the narrowband, the subcarrier index value 1 identities two consecutive PRBs with the start PRB being PRB #1 in the narrowband, the subcarrier index value 2 identities two consecutive PRBs with the start PRB being PRB #2 in the narrowband, the subcarrier index value 3 identities two consecutive PRBs with the start PRB being PRB #3 in the narrowband, the subcarrier index value 4 identities two consecutive PRBs with the start PRB being PRB #4 in the narrowband, the subcarrier index value 5 identities three consecutive PRBs with the start PRB being PRB #1 in the narrowband, the subcarrier index value 6 identities three consecutive PRBs with the start PRB being PRB #2 in the narrowband, and the subcarrier index value 7 identities three consecutive PRBs with the start PRB being PRB #3 in the narrowband.

In response to the physical resource block index value being 7, the subcarrier index value 0 identities three consecutive PRBs whose start position is PRB #3 in the narrowband, the subcarrier index value 1 identities four consecutive PRBs whose start position is PRB #0 in the narrowband, the subcarrier index value 2 identities four consecutive PRBs whose start position is PRB #1 in the narrowband, the subcarrier index value 3 identities four consecutive PRBs whose start position is PRB #2 in the narrowband, the subcarrier index value 4 identities five consecutive PRBs whose start position is PRB #0 in the narrowband, the subcarrier index value 5 identities five consecutive PRBs whose start position is PRB #1 in the narrowband, the subcarrier index value 6 identities six consecutive PRBs whose start position is PRB #0 in the narrowband. The physical resource block index values 0-5 respectively indicate physical resource blocks #0 to #5 in the narrowband.

In example 3, in response to the physical resource block index value being 0 to 5, the subcarrier index value 0 indicates a 3-subcarrier resource unit whose start position is subcarrier #0, the subcarrier index value 1 indicates a 3-subcarrier resource unit whose start position is subcarrier #3, the subcarrier index value 2 indicates a 3-subcarrier resource unit whose start position is subcarrier #6, and the subcarrier index value 3 indicates a 3-subcarrier resource unit whose start position is subcarrier #9.

In response to the physical resource block index values being 0 to 5, the subcarrier index value 4 indicates a 6-subcarrier resource unit whose start position is subcarrier #0, the subcarrier index value 5 indicates a 6-subcarrier resource unit whose start position is subcarrier #3, the subcarrier index value 6 indicates a 6-subcarrier resource unit whose start position is subcarrier #6, the subcarrier index value 7 indicates a full subcarrier resource unit whose start position is subcarrier #0. Alternatively, in response to the physical resource block index value being 0 to 5, the subcarrier index value 4 indicates a 6-subcarrier resource unit whose start position is subcarrier #0, the subcarrier index value 5 indicates a 6-subcarrier resource unit whose start position is subcarrier #6, and the subcarrier index value 6 indicates a full subcarrier resource unit whose start position is subcarrier #0.

In response to the physical resource block index values being 0 to 5, the number of time domain expansions of the uplink resource unit indicates a number of 3-subcarrier resource units and 6-subcarrier resource units in the time domain.

In response to the physical resource block index value being 6, the subcarrier index value 0 identifies two consecutive PRBs starting from PRB #0 in the narrowband, the subcarrier index value 1 identifies two consecutive PRBs starting from PRB #2 in the narrowband, the subcarrier index value 2 identifies two consecutive PRBs starting from PRB #4 in the narrowband, the subcarrier index value 3 identifies three consecutive PRBs starting from PRB #0 in the narrowband, the subcarrier index value 4 identifies three consecutive PRBs starting from PRB #3 in the narrowband, the subcarrier index value 5 identifies four consecutive PRBs starting from PRB #0 in the narrowband, and the subcarrier index value 6 identifies six consecutive PRBs starting from PRB #0 in the narrowband.

The physical resource block index value of 7 corresponds to a reserved state.

In an example 4, the physical resource block index values 0 to 5 respectively identify physical resource blocks #0 to #5 in the narrowband.

In response to the physical resource block index values being 0 to 5, the subcarrier index value 0 indicates a 3-subcarrier resource unit whose start position is subcarrier #0, the subcarrier index value 1 indicates a 3-subcarrier resource unit whose start position is subcarrier #3, the subcarrier index value 2 indicates a 3-subcarrier resource unit whose start position is subcarrier #6, and the subcarrier index value 3 indicates a 3-subcarrier resource unit whose start position is subcarrier #9.

In response to the physical resource block index values being 0 to 5, the subcarrier index value 4 indicates a 6-subcarrier resource unit whose start position is subcarrier #0, the subcarrier index value 5 indicates a 6-subcarrier resource unit whose start position is subcarrier #3, the subcarrier index value 6 indicates a 6-subcarrier resource unit whose start position is subcarrier #6, and the subcarrier index value 7 indicates a full subcarrier resource unit whose start position is subcarrier #0. Alternatively, in response to the physical resource block index values being 0 to 5, the subcarrier index value 4 indicates a 6-subcarrier resource unit whose start position is subcarrier #0, the subcarrier index value 5 indicates a 6-subcarrier resource unit whose start position is subcarrier #6, the subcarrier index value 6 indicates a full subcarrier resource unit whose start position is subcarrier #0, and the subcarrier index value 7 corresponds to a reserved state.

In response to the physical resource block index value is 0 to 5, the number of time domain expansions of the uplink resource unit indicates a number of 3-subcarrier resource units and 6-subcarrier resource units in the time domain.

The physical resource block index values 6-7 correspond to the reserved state.

In an example 5, the physical resource block index values 0 to 5 respectively identify physical resource blocks #0 to #5 in the narrowband.

In response to the physical resource block index value being 0 to 5, the subcarrier index value 0 indicates a 3-subcarrier resource unit whose start position is subcarrier #0, the subcarrier index value 1 indicates a 3-subcarrier resource unit whose start position is subcarrier #3, the subcarrier index value 2 indicates a 3-subcarrier resource unit whose start position is subcarrier #6, the subcarrier index value 3 indicates a 3-subcarrier resource unit whose start position is subcarrier #9.

In response to the physical resource block index value being 0 to 5, the subcarrier index value 4 indicates a 6-subcarrier resource unit whose start position is subcarrier #0, the subcarrier index value 5 indicates a 6-subcarrier resource unit whose start position is subcarrier #3, the subcarrier index value 6 indicates a 6-subcarrier resource unit whose start position is subcarrier #6, the subcarrier index value 7 corresponds to the reserved state. Alternatively, in response to the physical resource block index value being 0 to 5, the subcarrier index value 4 indicates a 6-subcarrier resource unit whose start position is subcarrier #0, the subcarrier index value 5 indicates a 6-subcarrier resource unit whose start position is subcarrier #6, and the subcarrier index values 6 and 7 correspond to the reserved state.

In response to the physical resource block index value being 0 to 5, the number of time domain expansions of the uplink resource unit indicates the number of 3-subcarrier resource units and 6-subcarrier resource units in the time domain.

In response to the physical resource block index value being 6, the PRB consecutive resource allocation in the narrowband is jointly indicated through total 5 bits, the allocated consecutive resource includes 1 to 6 physical resource blocks, and the 5 bits include 3 bits of the subcarrier index and 2 bits of the number of time domain expansions of the uplink resource unit (if the number of time domain expansions of the uplink resource unit is 3 bits, higher or lower 2 bits are used).

The physical resource block index value 7 corresponds to a reserved state.

In another specific implementation of the embodiment of the present disclosure, in response to the uplink resource allocation parameter only indicating the subcarrier-level resource allocation in the physical resource block, the overhead of the resource allocation is the same as the overhead of physical resource block level resource allocation in the narrowband in the existing LTE MTC system (Rel-13), the uplink resource allocation parameter is indicated through at most $$\left\lceil \log_2\left(\left\lfloor \frac{N_{RB}^{UL}}{6} \right\rfloor\right) \right\rceil + 5 \text{ bits,}$$

and may be indicated through one of three different modes.

Optionally, in response to the uplink resource allocation parameter only indicating the subcarrier-level resource allocation in the transmission of the physical uplink shared channel of the terminal, the method further includes the following step.

The uplink resource allocation parameter is indicated through at most $$\left\lceil \log_2\left(\left\lfloor \frac{N_{RB}^{UL}}{6} \right\rfloor\right) \right\rceil + 5 \text{ bits,}$$

or the uplink resource allocation parameter is indicated through $$\left\lceil \log_2\left(\left\lfloor \frac{N_{RB}^{UL}}{6} \right\rfloor\right)\right\rceil + 8 \text{ bits};$$

where $N_{RB}^{UL}$ indicates the number of uplink physical resource blocks.

The uplink resource allocation parameter is indicated through $$\left\lceil \log_2\left(\left\lfloor \frac{N_{RB}^{UL}}{6} \right\rfloor\right)\right\rceil + 5 \text{ bits}$$

as follows.

In response to the uplink resource allocation parameter including the narrowband index, the physical resource block index, and the subcarrier index, the narrowband index is indicated through $$\left\lceil \log_2\left(\left\lfloor \frac{N_{RB}^{UL}}{6} \right\rfloor\right)\right\rceil \text{ bits,}$$

and a combination of the physical resource block index and the subcarrier index is indicated through 5 bits; or the narrowband index is indicated through $$\left\lceil \log_2\left(\left\lfloor \frac{N_{RB}^{UL}}{6} \right\rfloor\right)\right\rceil \text{ bits,}$$

the subcarrier index through 3 is indicated bits, and the physical resource block is indicated index through 2 bits.

Indicating the physical resource block through 2 bits is as follows.

The physical resource block is indicated through a predefined rule or in a predefined implicit mode.

The predefined rule includes: predefining part of the physical resource blocks in the narrowband to be used in the allocation mode having a smaller uplink resource allocation granularity, and indicating a certain physical resource block through 2 bits in the uplink resource allocation parameter.

The predefined implicit mode includes: determining a physical resource block range available for the allocation mode having a smaller uplink resource allocation granularity according to a resource position of control information transmitting the uplink resource allocation parameter. The resource position includes, but is not limited to: a narrowband sequence number, a subframe number, a control channel element index and a candidate set index.

Indicating of the uplink resource allocation parameter through $$\left\lceil \log_2\left(\left\lfloor \frac{N_{RB}^{UL}}{6} \right\rfloor\right)\right\rceil + 5 \text{ bits}$$

is as follows.

The uplink resource allocation parameter includes a resource indication value (RIV), where each RIV corresponds to the physical resource block index and the subcarrier index.

Specifically, each RIV corresponding to the physical resource block index and the subcarrier index is as follows.

RIV=the subcarrier index value+(the physical resource block index value−offset)×a total number of states of the subcarrier index; where the total number of states of the subcarrier index is six or seven;

$$\text{offset} = \left(\text{a number of } PRBs \text{ in a system bandwidth} - \left\lfloor \frac{2^Y}{\text{the total number of states of the subcarrier index}} \right\rfloor\right) \Big/ 2.$$

In the formula, PRB denotes the physical resource block, and $$Y = \left\lceil \log_2\left(\left\lfloor \frac{N_{RB}^{UL}}{6} \right\rfloor\right)\right\rceil + 5.$$

Indicating the uplink resource allocation parameter through $$\left\lceil \log_2\left(\left\lfloor \frac{N_{RB}^{UL}}{6} \right\rfloor\right)\right\rceil + 8 \text{ bits}$$

includes the following step.

In the case where the uplink resource allocation parameter includes the narrowband index, the physical resource block index, the subcarrier index and the number of time domain expansions of the uplink resource unit, the narrowband index in the uplink resource allocation parameter is indicated through $$\left\lceil \log_2\left(\left\lfloor \frac{N_{RB}^{DL}}{6} \right\rfloor\right)\right\rceil \text{ bits,}$$

and the physical resource block index, the subcarrier index and an index value of the number of time domain expansions of the uplink resource unit are jointly indicated through 8-bit RIV.

Specifically, jointly indicating the physical resource block index, the subcarrier index and the index value of the number of time domain expansions of the uplink resource unit through 8-bit RIV includes:

RIV=the subcarrier index value+the physical resource block index value×the total number of states of the subcarrier index+the index value of the number of time domain expansions of the uplink resource unit×a total number of states of the physical resource block index×the total number of states of the subcarrier index;

alternatively, RIV=the physical resource block index value+the subcarrier index value×the total number of states of the subcarrier index+the index value of the number of time domain expansions of the uplink resource unit×the total number of states of the physical resource block index×the total number of states of the subcarrier index;

alternatively, RIV=the index value of the number of time domain expansions of the uplink resource unit+the subcarrier index value×a total number of states of the number of time domain expansions of the uplink resource unit+the physical resource block index value×the total number of states of the number of time domain expansions of the uplink resource unit×the total number of states of the subcarrier index.

In an example 1, the uplink resource allocation parameter is $$\left\lceil \log_2\left(\left\lfloor \frac{N_{RB}^{UL}}{6} \right\rfloor\right) \right\rceil + 5 \text{ bits}$$

and includes the narrowband index, the physical resource block index and the subcarrier index, the narrowband index in the uplink resource allocation parameter is indicated through $$\left\lceil \log_2\left(\left\lfloor \frac{N_{RB}^{UL}}{6} \right\rfloor\right) \right\rceil \text{ bits,}$$

and a combination of the physical resource block index and the subcarrier index in the uplink resource allocation parameter is indicated through 5 bits.

Moreover, in addition to the narrowband index, the physical resource block index and the subcarrier index, the number of time domain expansions of the uplink resource unit is 3 bits and indicates a number of 3-subcarrier resource units and 6-subcarrier resource units in the time domain.

In an example 2, the uplink resource allocation parameter is $$\left\lceil \log_2\left(\left\lfloor \frac{N_{RB}^{UL}}{6} \right\rfloor\right) \right\rceil + 5 \text{ bits}$$

and includes the narrowband index, the physical resource block index and the subcarrier index. The narrowband index in the uplink resource allocation parameter is indicated through $$\left\lceil \log_2\left(\left\lfloor \frac{N_{RB}^{UL}}{6} \right\rfloor\right) \right\rceil \text{ bits.}$$

The subcarrier index in the uplink resource allocation parameter is indicated through 3 bits. The physical resource block index in the uplink resource allocation parameter is indicated through 2 bits, and the physical resource block index is indicated in combination with a predefined rule or a predefined implicit mode.

Further, the predefined rule is to predefine part of physical resource blocks in the narrowband, the predefined physical resource blocks are used for the allocation mode having a smaller uplink resource allocation granularity, and a certain physical resource block is indicated through 2 bits in the uplink resource allocation parameter.

Further, the implicit mode is to determine a physical resource block range available for the allocation mode having a smaller uplink resource allocation granularity according to a resource position of control information transmitting the uplink resource allocation parameter. The resource position includes, but is not limited to: a narrowband index, a subframe index, a control channel element index (CCE index) and a candidate set index. For example, the control information for transmitting the uplink resource allocation parameter is in an odd subframe, a physical resource block indicated by the physical resource block index available for the allocation mode having a smaller uplink resource allocation granularity is a physical resource block having an odd physical resource block index, i.e., a physical resource block #1, a physical resource block #3 and a physical resource block #5. A certain physical resource block among the physical resource blocks #1, #3 and #5 is indicated by 2 bits in the uplink resource allocation parameter.

Moreover, in addition to the narrowband index, the physical resource block index and the subcarrier index, the number of time domain expansions of the uplink resource unit is 3 bits and indicates a number of 3-subcarrier resource units and 6-subcarrier resource units in the time domain.

In an example 3, the uplink resource allocation parameter is $$\left\lceil \log_2\left(\left\lfloor \frac{N_{RB}^{UL}}{6} \right\rfloor\right) \right\rceil + 5 \text{ bits}$$

and includes a resource indication value (RIV) that is $$Y = \left\lceil \log_2\left(\left\lfloor \frac{N_{RB}^{UL}}{6} \right\rfloor\right) \right\rceil + 5 \text{ bits.}$$

For each RIV, its corresponding physical resource block index and subcarrier index specifically include:

RIV=the subcarrier index value+(the physical resource block index value−offset)×a total number of states of the subcarrier index; where the total number of states of the subcarrier index is six or seven;

$$\text{offset} = \left(\text{a number of } PRBs \text{ in a system bandwidth} - \left\lfloor \frac{2^Y}{\text{the total number of states of the subcarrier index}} \right\rfloor\right) / 2.$$

Moreover, in addition to the narrowband index, the physical resource block index and the subcarrier index, the number of time domain expansions of the uplink resource unit is 3 bits and indicates a number of 3-subcarrier resource units and 6-subcarrier resource units in the time domain.

For another example, in response to the uplink resource allocation parameter only indicating the subcarrier-level resource allocation in the physical resource block, indicating the uplink resource allocation parameter through $$\left\lceil \log_2\left(\left\lfloor \frac{N_{RB}^{UL}}{6} \right\rfloor\right) \right\rceil + 8 \text{ bits}$$

is as follows.

The uplink resource allocation parameter includes the narrowband index, the physical resource block index, the subcarrier index and the number of time domain expansions of the uplink resource unit. The narrowband index in the uplink resource allocation parameter is indicated through bits. The physical resource block index, the subcarrier index and an index value of the number of time domain expansions of the uplink resource unit are jointly indicated through 8-bit RIV, and the jointly indicating specifically includes one of:

RIV=the subcarrier index value+the physical resource block index value×the total number of states of the subcarrier index+the index value of the number of time domain expansions of the uplink resource unit×a total number of states of the physical resource block index×the total number of states of the subcarrier index;

or RIV=the physical resource block index value+the subcarrier index value×the total number of states of the subcarrier index+the index value of the number of time domain expansions of the uplink resource unit×the total number of states of the physical resource block index×the total number of states of the subcarrier index;

or RIV=the index value of the number of time domain expansions of the uplink resource unit+the subcarrier index value×a total number of states of the number of time domain expansions of the uplink resource unit+the physical resource block index value×the total number of states of the number of time domain expansions of the uplink resource unit×the total number of states of the subcarrier index.

The total number of states of the subcarrier index is 6 or 7. The total number of states of the physical resource block index is 6, which respectively indicates one physical resource block in the narrowband. The total number of states of the number of time domain expansions of the uplink resource unit is 6, which respectively indicates 1 to 6 uplink resource units in the time domain.

Embodiment Two

Figure 2:
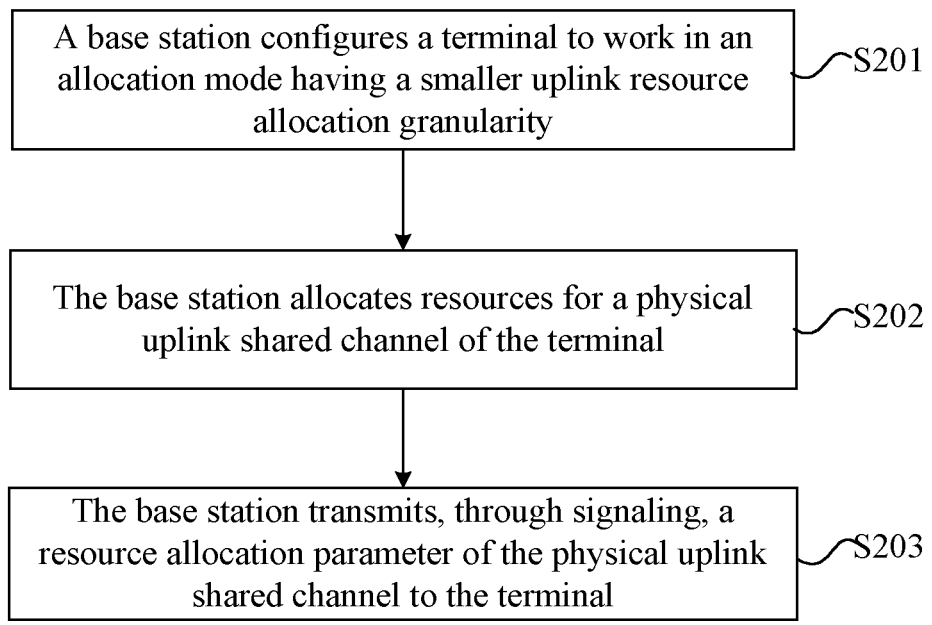
FIG. 2 is a specific flowchart of a resource allocation method according to an embodiment of the present disclosure.

As shown in FIG. 2, this embodiment provides a resource allocation method, including the steps described below.

In S201, a base station configures, through user-specific RRC signaling, a terminal to work in an allocation mode having a smaller uplink resource allocation granularity.

In S202, the base station allocates resources for a physical uplink shared channel of the terminal.

In S203, the base station transmits, through signaling, a resource allocation parameter of the physical uplink shared channel to the terminal.

In the embodiment of the present disclosure, resources of different granularities are flexibly allocated. That is, the base station may flexibly perform subcarrier-level resource allocation in the physical resource block and PRB-level resource allocation in the narrowband for the terminal.

The resource allocation parameter of the physical uplink shared channel includes: a narrowband index, a physical resource block index and a subcarrier index. The narrowband index is used for identifying the narrowband position information of the allocated resources. The narrowband consists of 6 consecutive PRBs. The narrowband index is indicated through $$\left\lceil \log_2\left(\left\lfloor \frac{N_{RB}^{UL}}{6} \right\rfloor\right) \right\rceil \text{ bits.}$$

The resource block index is used for identifying the information of the physical resource blocks in which the allocated resources are located. For the PUSCH with a 15 kHz subcarrier spacing, each physical resource block includes 12 consecutive subcarriers in the frequency domain.

Figure 3:
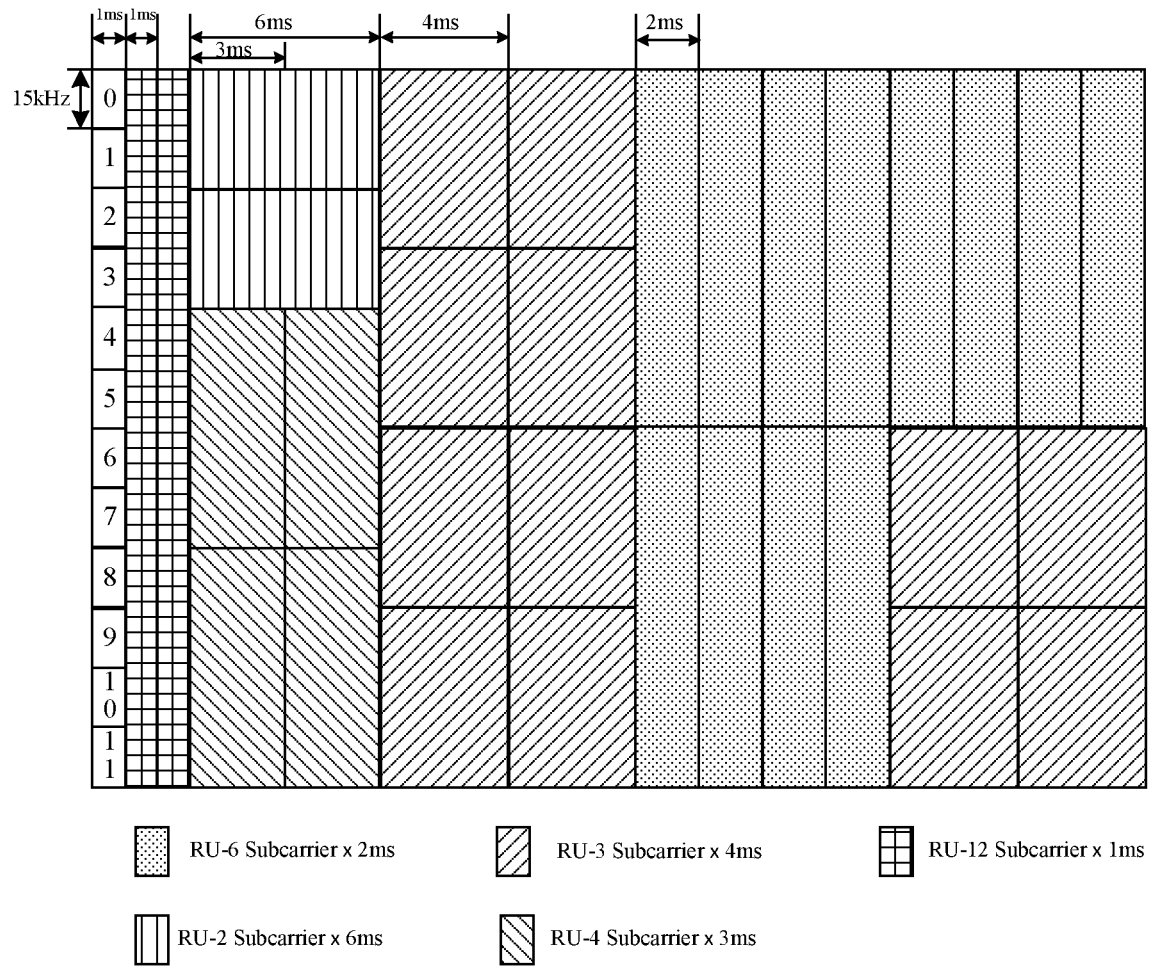
FIG. 3 is a schematic diagram of an uplink resource unit according to an embodiment of the present disclosure.

The subcarrier index is used for identifying a frequency domain subcarrier position of the uplink resource unit in the physical resource unit. As shown in FIG. 3, the uplink resource unit may be configured to be one or more of the followings.

The uplink resource unit includes one subcarrier in the frequency domain, and is referred to as a single carrier resource unit.

The uplink resource unit includes two consecutive subcarriers in the frequency domain, and is referred to as a 2-subcarrier resource unit.

The uplink resource unit includes three consecutive subcarriers in the frequency domain, and is referred to as a 3-subcarrier resource unit.

The uplink resource unit includes four consecutive subcarriers in the frequency domain, and is referred to as a 4-subcarrier resource unit.

The uplink resource unit includes six subcarriers in the frequency domain, and is referred to as a 6-subcarrier resource unit.

The uplink resource unit includes 12 consecutive subcarriers in the frequency domain, and is referred to as a full subcarrier resource unit.

Figure 4:
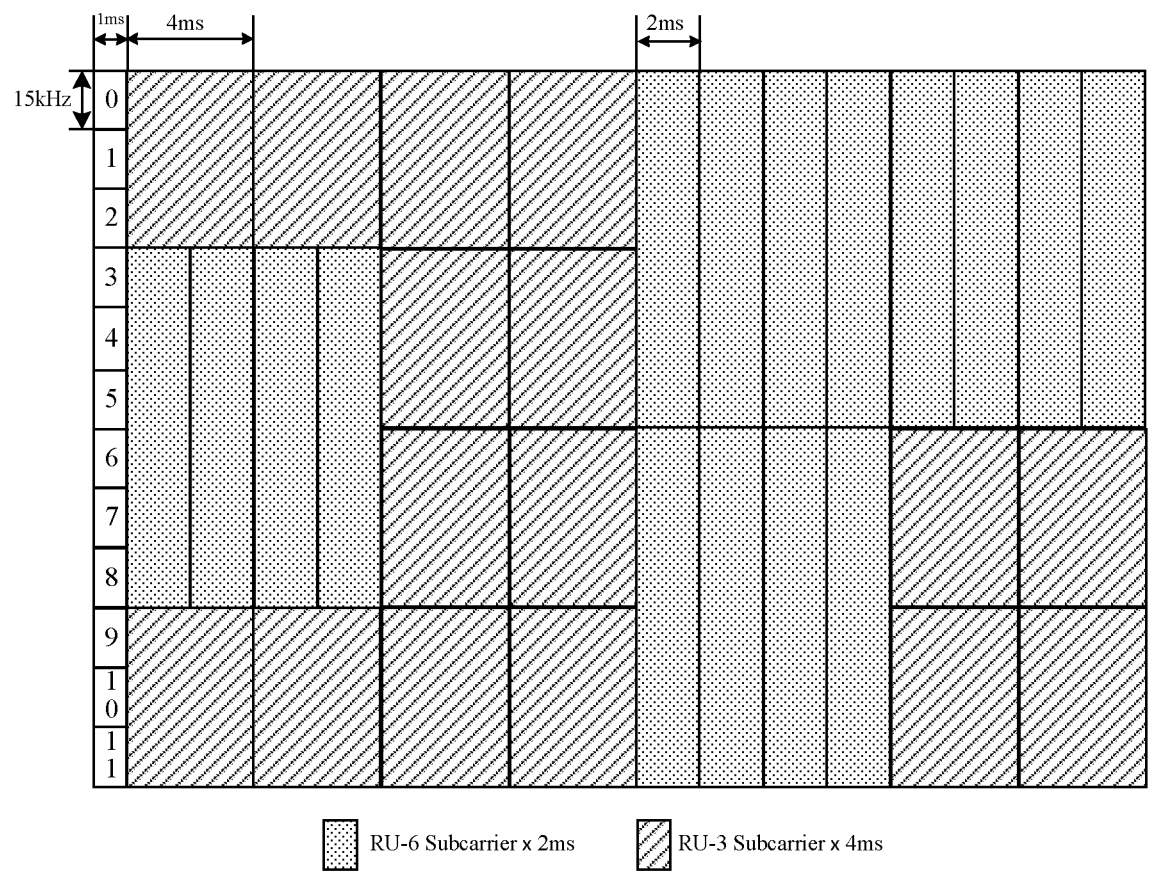
FIG. 4 is a schematic diagram of a 3-carrier uplink resource unit and a 6-carrier uplink resource unit according to an embodiment of the present disclosure.
Figure 5:
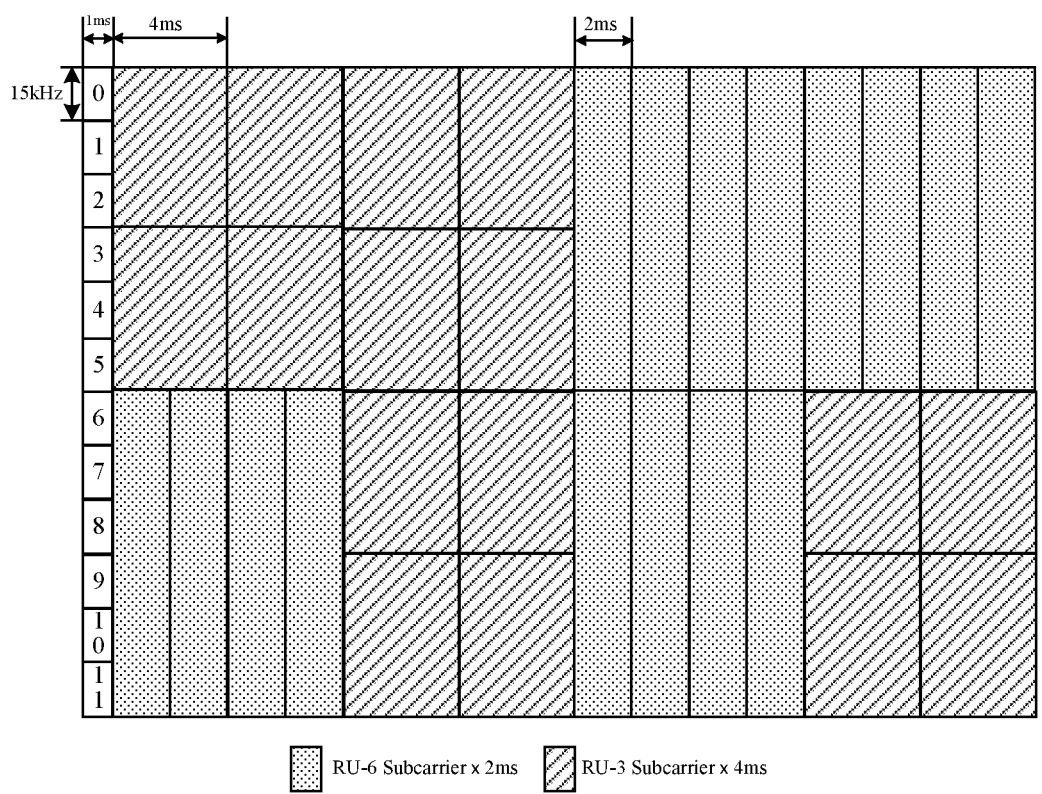
FIG. 5 is a schematic diagram of another 3-carrier uplink resource unit and another 6-carrier uplink resource unit according to an embodiment of the present disclosure.

Typically, as shown in FIG. 4 or FIG. 5, the 3-subcarrier resource unit, the 6-subcarrier resource unit and the full subcarrier resource unit are selected in the resource allocation. The frequency domain subcarrier position of the 3-subcarrier resource unit has four resource positions, and the start positions of the four resource positions are: subcarrier #0, subcarrier #3, subcarrier #6 and subcarrier #9. A frequency domain subcarrier position of the full subcarrier resource unit is fixed to be a subcarrier #0.

Preferably, as shown in FIG. 4, the frequency domain subcarrier position of the 6-subcarrier resource unit has three resource positions, and the start positions of the three resource positions are subcarrier #0, subcarrier #3 and subcarrier #6. Alternatively, as shown in FIG. 5, the frequency domain subcarrier position of the 6-subcarrier resource unit has two resource positions, and the start positions of the two resource positions are subcarrier #0 and subcarrier #6.

The physical resource block index is indicated through 3 bits, the subcarrier index is indicated through 3 bits, and the physical resource block index and the subcarrier index further include:

1) the physical resource block index values 0 to 5 respectively identify physical resource blocks #0 to #5 in the narrowband.

In response to the physical resource block index values being 0 to 5, the subcarrier index values 0 to 3 respectively indicate: the 3-subcarrier resource unit whose start position is subcarrier #0, the 3-subcarrier resource unit whose start position is subcarrier #3, the 3-subcarrier resource unit whose start position is subcarrier #6 and the 3-subcarrier resource unit whose start position is subcarrier #9; the subcarrier index values 4 to 6 respectively indicate: the 6-subcarrier resource unit whose start position is subcarrier #0, the 6-subcarrier resource unit whose start position is subcarrier #3, and the 6-subcarrier resource unit whose start position is subcarrier #6; and the subcarrier index value 7 indicates the full subcarrier resource unit whose start position is the subcarrier #0, as shown in table 1.

TABLE 1

| Subcarrier index $I_{SC}$ | Subcarrier corresponding to the allocated resources |
| --- | --- |
| 0-3 | $3I_{SC} + \{0, 1, 2\}$ |
| 4-5 | $6(I_{SC} - 4) + \{0, 1, 2, 3, 4, 5\}$ |
| 6 | $3(I_{SC} - 5) + \{0, 1, 2, 3, 4, 5\}$ |
| 7 | $\{0, 1, 2, 3, 4, 5, 6, 7, 8, 9, 10, 11\}$ |

In response to the physical resource block index values being 0 to 5, the subcarrier index values 4 to 5 respectively indicate: the 6-subcarrier resource unit whose start position is subcarrier #0 and the 6-subcarrier resource unit whose start position is subcarrier #6; the subcarrier index value 6 indicates the full subcarrier resource unit whose start position is subcarrier #0, as shown in table 2.

TABLE 2

| Subcarrier index $I_{SC}$ | Subcarrier corresponding to the allocated resources |
| --- | --- |
| 0-3 | $3I_{SC} + \{0, 1, 2\}$ |
| 4-5 | $6(I_{SC} - 4) + \{0, 1, 2, 3, 4, 5\}$ |
| 6 | $\{0, 1, 2, 3, 4, 5, 6, 7, 8, 9, 10, 11\}$ |
| 7 | Reserved |

In response to the physical resource block index values being 0 to 5, the subcarrier index values 4 to 5 respectively indicate the 6-subcarrier resource whose start position is subcarrier #0 and the 6-subcarrier resource whose start position is subcarrier #6; the subcarrier index value 6 indicates the 6-subcarrier resource unit whose start position is subcarrier #3; the subcarrier index value 7 is reserved, as shown in table 3.

TABLE 3

| Subcarrier index $I_{SC}$ | Subcarrier corresponding to the allocated resources |
| --- | --- |
| 0-3 | $3I_{SC} + \{0, 1, 2\}$ |
| 4-5 | $6(I_{SC} - 4) + \{0, 1, 2, 3, 4, 5\}$ |
| 6 | $3(I_{SC} - 5) + \{0, 1, 2, 3, 4, 5\}$ |
| 7 | Reserved |

In response to the physical resource block index values being 0 to 5, the number of time domain expansions of the uplink resource unit indicates the number of 3-subcarrier resource units and 6-subcarrier resource units in the time domain.

The physical resource block index value 6 identifies first four physical resource blocks in the narrowband, i.e., resource blocks #0 to #3. The physical resource block index value 7 identifies all 6 physical resource blocks in the allocated narrowband.

2) The physical resource block index values 0 to 5 respectively identify physical resource blocks #0 to #5 in the narrowband.

In response to the physical resource block index values being 0 to 5, the subcarrier index values 0 to 3 respectively indicate: the 3-subcarrier resource unit whose start position is subcarrier #0, the 3-subcarrier resource unit whose start position is subcarrier #3, the 3-subcarrier resource unit whose start position is subcarrier #6 and the 3-subcarrier resource unit whose start position is subcarrier #9; the subcarrier index values 4 to 6 respectively indicate: the 6-subcarrier resource unit whose start position is subcarrier #0, the 6-subcarrier resource unit whose start position is subcarrier #3 and the 6-subcarrier resource unit whose start position is subcarrier #6; and the subcarrier index value 7 indicates the full subcarrier resource unit whose start position is subcarrier #0. Alternatively, in response to the physical resource block index values being 0 to 5, the subcarrier index values 4 to 5 respectively indicate: the 6-subcarrier resource unit whose start position is subcarrier #0 and the 6-subcarrier resource unit whose start position is subcarrier #6; and the subcarrier index value 6 indicates the full subcarrier resource unit whose start position is subcarrier #0, as shown in table 2.

In response to the physical resource block index values being 0 to 5, the number of time domain expansions of the uplink resource unit indicates the number of the 3-subcarrier resource units and the 6-subcarrier resource units in the time domain.

In response to the physical resource block index value being 6, the subcarrier index values 0 to 4 respectively identify: two consecutive PRBs starting from PRB #0 in the narrowband, two consecutive PRBs starting from PRB #1 in the narrowband, two consecutive PRBs starting from PRB #2 in the narrowband, two consecutive PRBs starting from PRB #3 in the narrowband and two consecutive PRBs starting from PRB #4 in the narrowband; and the subcarrier index values 5 to 7 respectively identify: three consecutive PRBs starting from PRB #0 in the narrowband, three consecutive PRBs starting from PRB #1 in the narrowband and three consecutive PRBs starting from PRB #2 in the narrowband.

In response to the physical resource block index value being 7, the subcarrier index value 0 identifies three consecutive PRBs starting from PRB #3 in the narrowband; the sub carrier index values 1 to 3 respectively identify: four consecutive PRBs starting from PRB #0 in the narrowband, four consecutive PRBs starting from PRB #1 in the narrowband and four consecutive PRBs starting from PRB #2 in the narrowband; the subcarrier index values 4 and 5 respectively identify: five consecutive PRBs starting from PRB #0 in the narrowband and five consecutive PRBs starting from PRB #1 in the narrowband; and the subcarrier index value 6 identifies six consecutive PRBs starting from PRB #0.

3) the physical resource block index values 0 to 5 respectively identify physical resource blocks #0 to #5 in the narrowband.

In response to the physical resource block index values being 0 to 5, the subcarrier index values 0 to 3 respectively indicate: a 3-subcarrier resource unit whose start position is subcarrier #0, a 3-subcarrier resource unit whose start position is subcarrier #3, a 3-subcarrier resource unit whose start position is subcarrier #6, and a 3-subcarrier resource unit whose start position is subcarrier #9; the subcarrier index values 4 to 6 respectively indicate: a 6-subcarrier resource unit whose start position is subcarrier #0, a 6-subcarrier resource unit whose start position is subcarrier #3 and a 6-subcarrier resource unit whose start position is subcarrier #6; and the subcarrier index value 7 indicates the full subcarrier resource unit whose start position is subcarrier #0. Alternatively, in response to the physical resource block index values being 0 to 5, the subcarrier index values 4 to 5 respectively indicate: a-6 subcarrier resource unit whose start position is subcarrier #0 and a-6 subcarrier resource unit whose start position is subcarrier #6; and the subcarrier index value 6 indicates the full subcarrier resource unit whose start position is the subcarrier #0, as shown in table 2.

In response to the physical resource block index values being 0 to 5, the number of time domain expansions of the uplink resource unit indicates a number of 3-subcarrier resource units and 6-subcarrier resource units in the time domain.

In response to the physical resource block index value being 6, the subcarrier index values 0 to 2 respectively identify: two consecutive PRBs starting from PRB #0, two consecutive PRBs starting from PRB #2 and two consecutive PRBs starting from PRB #4 in the narrowband; the subcarrier index values 3 to 4 respectively identify: three consecutive PRBs starting from PRB #0 and three consecutive PRBs starting from PRB #3 in the narrowband; the subcarrier index value 5 identifies four consecutive PRBs starting from PRB #0 in the narrowband; the subcarrier index value 6 identifies six consecutive PRBs starting from PRB #0 in the narrowband; and the physical resource block index value 7 corresponds to a reserved state.

4) the physical resource block index values 0 to 5 respectively identify physical resource blocks #0 to #5 in the narrowband.

In response to the physical resource block index values being 0 to 5, the subcarrier index values 0 to 3 respectively indicate: a 3-subcarrier resource unit whose start position is subcarrier #0, a 3-subcarrier resource unit whose start position is subcarrier #3, a 3-subcarrier resource unit whose start position is subcarrier #6 and a 3-subcarrier resource unit whose start position is subcarrier #9; the subcarrier index values 4 to 6 respectively indicate: a 6-subcarrier resource unit whose start position is subcarrier #0, a 6-subcarrier resource unit whose start position is subcarrier #3 and a 6-subcarrier resource unit whose start position is subcarrier #6; and the subcarrier index value 7 indicates the full subcarrier resource unit whose start position is subcarrier #0, as shown in table 1. Alternatively, in response to the physical resource block index values being 0 to 5, the subcarrier index values 4 to 5 respectively indicate a 6-subcarrier resource unit whose start position is subcarrier #0 and a 6-subcarrier resource unit whose start position is subcarrier #6; and the subcarrier index value 7 corresponds to a reserved state, as shown in table 2. Alternatively, in response to the physical resource block index values being 0 to 5, the subcarrier index values 4 to 5 respectively indicate: a 6-subcarrier resource unit whose start position is subcarrier #0 and a 6-subcarrier resource unit whose start position is subcarrier #6; the subcarrier index value 6 indicates the 6 subcarrier resource unit whose start position is subcarrier #3; and the subcarrier index value 7 corresponds to a reserved state, as shown in table 3.

In response to the physical resource block index values being 0 to 5, the number of time domain expansions of the uplink resource unit indicates a number of 3-subcarrier resource units and 6-subcarrier resource units in the time domain.

The physical resource block index value 6 identifies first four physical resource blocks in the narrowband, i.e., resource blocks #0 to #3. The physical resource block index values 6 to 7 correspond to the reserved state.

5) The physical resource block index values 0 to 5 respectively identify physical resource blocks #0 to #5 in the narrowband.

In response to the physical resource block index values being 0 to 5, the subcarrier index values 0 to 3 respectively indicate: a 3-subcarrier resource unit whose start position is subcarrier #0, a 3-subcarrier resource unit whose start position is subcarrier #3, a 3-subcarrier resource unit whose start position is subcarrier #6 and a 3-subcarrier resource unit whose start position is subcarrier #9.

In response to the physical resource block index values being 0 to 5, the subcarrier index values 4 to 6 respectively indicate: a 6-subcarrier resource unit whose start position is subcarrier #0, a 6-subcarrier resource unit whose start position is subcarrier #3 and a 6-subcarrier resource unit whose start position is subcarrier #6; and the subcarrier index value 7 corresponds to the reserved state. Alternatively, in response to the physical resource block index values being 0 to 5, the subcarrier index values 4 to 5 respectively indicate: a 6-subcarrier resource unit whose start position is subcarrier #0 and a 6-subcarrier resource unit whose start position is subcarrier #6; and the subcarrier index values 6 to 7 correspond to the reserved state.

In response to the physical resource block index values being 0 to 5, the number of time domain expansions of the uplink resource unit indicates a number of 3-subcarrier resource units and 6-subcarrier resource units in the time domain.

In response to the physical resource block index value being 6, the consecutive resource allocation in the narrowband is indicated by means of 5 bits, the number of PRBs in the consecutive resource allocation is one to six, and the 5 bits include 3 bits of the subcarrier index and the higher 2 bits or lower 2 bits of the number of time domain expansions of the uplink resource unit.

The physical resource block index value of 7 is the reserved state.

Embodiment Three

As shown in FIG. 2, this embodiment provides a resource allocation method, including the steps described below.

In S201, a base station configures a terminal to work in an allocation mode having a smaller uplink resource allocation granularity through user-specific RRC signaling.

In S202, the base station allocates resources for a physical uplink shared channel of the terminal.

The base station performs subcarrier-level resource allocation in the physical resource block for the terminal.

In S203, the base station sends a resource allocation parameter of the physical uplink shared channel to the terminal through signaling. The resource allocation parameter of the physical uplink shared channel is indicated through at most $$\left\lceil \log_2\left(\left\lfloor \frac{N_{RB}^{UL}}{6} \right\rfloor\right)\right\rceil + 5 \text{ bits,}$$

where the indication is as follows.

i) The uplink resource allocation parameter includes a narrowband index, a physical resource block index and a subcarrier index. The narrowband index in the uplink resource allocation parameter is indicated through $$\left\lceil \log_2\left(\left\lfloor \frac{N_{RB}^{UL}}{6} \right\rfloor\right)\right\rceil \text{ bits.}$$

A combination of the physical resource block index and the subcarrier index in the uplink resource allocation parameter is indicated through 5 bits.

Moreover, in addition to the narrowband index, the physical resource block index and the subcarrier index, the number of time domain expansions of the uplink resource unit is 3 bits and indicates the number of 3-subcarrier resource units and 6-subcarrier resource units in the time domain.

ii) The uplink resource allocation parameter includes the narrowband index, the physical resource block index and the subcarrier index. The narrowband index in the uplink resource allocation parameter is indicated through $$\left\lceil \log_2\left(\left\lfloor \frac{N_{RB}^{UL}}{6} \right\rfloor\right) \right\rceil \text{ bits.}$$

The subcarrier index in the uplink resource allocation parameter is indicated through 3 bits. The physical resource block index in the uplink resource allocation parameter is indicated through 2 bits. The physical resource block is indicated in combination with a predefined rule or implicit mode.

Further, the predefined rule is to: predefine part of the physical resource blocks in the narrowband to be used in the allocation mode having a smaller uplink resource allocation granularity, and indicate a certain physical resource block through 2 bits in the uplink resource allocation parameter.

Further, the implicit mode is to determine a physical resource block range available for the allocation mode having a smaller uplink resource allocation granularity according to a resource position of control information transmitting the uplink resource allocation parameter. The resource position includes, but is not limited to: a narrowband index, a subframe index, a control channel element index (CCE index) and a candidate set index. For example, the control information for transmitting the uplink resource allocation parameter is in an odd subframe, a physical resource block indicated by the physical resource block index available for the allocation mode having a smaller uplink resource allocation granularity is a physical resource block having an odd physical resource block index, i.e., a physical resource block #1, a physical resource block #3 and a physical resource block #5. A certain physical resource block among the physical resource blocks #1, #3 and #5 is indicated by 2 bits in the uplink resource allocation parameter.

Moreover, in addition to the narrowband index, the physical resource block index and the subcarrier index, the number of time domain expansions of the uplink resource unit is 3 bits and indicates the number of 3-subcarrier resource units and 6-subcarrier resource units in the time domain.

iii) The uplink resource allocation parameter includes a resource indication value (RIV) that is $$Y = \left\lceil \log_2\left(\left\lfloor \frac{N_{RB}^{UL}}{6} \right\rfloor\right) \right\rceil + 5 \text{ bits.}$$

For each RIV, its corresponding physical resource block index and subcarrier index specifically include:

RIV=the subcarrier index value+(the physical resource block index value−offset)×a total number of states of the subcarrier index; where the total number of states of the subcarrier index is six or seven;

$$\text{offset} = \left(\text{a number of PRBs in a system bandwidth} - \left\lfloor \frac{2^Y}{\text{the total number of states of the subcarrier index}} \right\rfloor\right)/2.$$

Moreover, in addition to the narrowband index, the physical resource block index and the subcarrier index, the number of time domain expansions of the uplink resource unit is 3 bits and indicates the number of 3-subcarrier resource units and 6-subcarrier resource units in the time domain.

The embodiment of the present disclosure effectively ensures the overhead be minimized.

Embodiment Four

As shown in FIG. 2, this embodiment provides a resource allocation method, including the steps described below.

In S201, a base station configures a terminal to work in an allocation mode having a smaller uplink resource allocation granularity through user-specific RRC signaling.

In S202, the base station allocates resources for a physical uplink shared channel of the terminal.

The base station performs subcarrier-level resource allocation in the physical resource block for the terminal.

In S203, the base station transmits a resource allocation parameter of the physical uplink shared channel to the terminal. The uplink resource allocation parameter is indicated through $$\left\lceil \log_2\left(\left\lfloor \frac{N_{RB}^{UL}}{6} \right\rfloor\right) \right\rceil + 8 \text{ bits,}$$

and includes: a narrowband index, a physical resource block index, a subcarrier index and a number of time domain expansions of an uplink resource unit. The narrowband index in the uplink resource allocation parameter is indicated through $$\left\lceil \log_2\left(\left\lfloor \frac{N_{RB}^{UL}}{6} \right\rfloor\right) \right\rceil \text{ bits.}$$

The physical resource block index, the subcarrier index and an index value of the number of time domain expansions of the uplink resource unit are jointly indicated through 8-bit RIV, which specifically includes one of the following.

RIV=the subcarrier index value+the physical resource block index value×the total number of states of the subcarrier index+the index value of the number of time domain expansions of the uplink resource unit×a total number of states of the physical resource block index×the total number of states of the subcarrier index;

or RIV=the physical resource block index value+the subcarrier index value×the total number of states of the subcarrier index+the index value of the number of time domain expansions of the uplink resource unit×the total number of states of the physical resource block index×the total number of states of the subcarrier index;

or RIV=the index value of the number of time domain expansions of the uplink resource unit+the subcarrier index value×a total number of states of the number of time domain expansions of the uplink resource unit+the physical resource block index value×the total number of states of the number of time domain expansions of the uplink resource unit×the total number of states of the subcarrier index.

The total number of states of the subcarrier index is 6 or 7. The total number of states of the physical resource block index is 6, each of which indicates one physical resource block in the narrowband. The total number of states of the number of time domain expansions of the uplink resource unit is 6, which respectively indicate 1 to 6 uplink resource units in the time domain.

Embodiment Five

An embodiment of the present disclosure provides a resource allocation device. The device includes a memory and a processor. The memory stores a resource allocation program. The processor executes the resource allocation program to implement the following steps.

Resources for transmission of a physical uplink shared channel of a terminal are configured through an uplink resource allocation parameter.

The uplink resource allocation parameter is transmitted to the terminal. The uplink resource allocation parameter includes at least one of: a narrowband index, a physical resource block index, a subcarrier index or a number of time domain expansions of an uplink resource unit.

Through the embodiment of the present disclosure, the base station configures resource for the transmission of the physical uplink shared channel of the terminal, and transmits the uplink resource allocation parameter to the terminal, such that the problem in the related art that the resource allocation for the PUSCH can only be performed with a minimum resource allocation granularity of one physical resource block is solved, thereby reducing the resource allocation granularity. Therefore, the MTC terminal can transmit the PUSCH with lager power, spectrum efficiency is further expanded, and coverage performance of the PUSCH of the MTC terminal is improved.

Optionally, configuring resources for the transmission of the physical uplink shared channel of the terminal through an uplink resource allocation parameter includes:

identifying narrowband position information of the configured resources through the narrowband index;

identifying information of a physical resource block of the configured resources through the physical resource block index; and identifying a frequency domain subcarrier position of the uplink resource unit in the physical resource unit through the subcarrier index.

Optionally, the narrowband consists of 6 consecutive physical resource blocks, each of which includes 12 consecutive subcarriers in a frequency domain.

Optionally, the narrowband index is indicated through $$\left\lceil \log_2\left(\left\lfloor \frac{N_{RB}^{UL}}{6} \right\rfloor\right) \right\rceil,$$

where $N_{RB}^{UL}$ denotes a number of uplink physical resource blocks.

Optionally, the uplink resource unit is at least one of the following configurations: a single carrier resource unit, a 2-subcarrier resource unit, a 3-subcarrier resource unit, a 4-subcarrier resource unit, a 6-subcarrier resource unit, a 9-subcarrier resource unit, or a full subcarrier resource unit.

Specifically, in response to the uplink resource unit including less than 12 subcarriers in the frequency domain, a number of uplink resource units in a time domain is indicated through the number of time domain expansions of the uplink resource unit.

Optionally, configuring resources for the transmission of the physical uplink shared channel of the terminal through an uplink resource allocation parameter includes: in an allocation mode having a smaller uplink resource allocation granularity, indicating, through the uplink resource allocation parameter, a subcarrier-level resource allocation in the physical resource block and/or a physical-resource-block-level resource allocation in the narrowband in the transmission of the physical uplink shared channel of the terminal. The allocation mode having a smaller uplink resource allocation granularity is an allocation mode whose resource allocation granularity is less than one physical resource block.

Specifically, each of the physical resource block index and the subcarrier index is indicated through 3 bits. The number of time domain expansions of the uplink resource unit is indicated through 2 bits or 3 bits.

Further, the physical resource block index and the subcarrier index are indicated each one through 3 bits in the following manner.

In response to the physical resource block index values being 0 to 5, the physical resource block index values 0 to 5 respectively identify physical resource blocks #0 to #5 in the narrowband. In response to the physical resource block index values being 6 and 7, the indication is in any one of the following manners.

Manner one: in response to the physical resource block index value being 6, this physical resource block index value identifies first 4 physical resource blocks in an allocated narrowband; and in response to the physical resource block index value being 7, this physical resource block index value identifies all 6 physical resource blocks in the allocated narrowband.

Manner two: in response to the physical resource block index value being 6, each of subcarrier index values 0 to 4 identifies two consecutive physical resource blocks, and each of subcarrier index values 5 to 7 respectively marking three consecutive physical resource blocks. In response to the physical resource block index value being 7, the subcarrier index value 0 identifies three consecutive physical resource blocks in the narrowband, each of the subcarrier index values 1 to 3 respectively identifies four consecutive physical resource blocks in the narrowband, each of the subcarrier index values 4 to 5 respectively identifies five consecutive physical resource blocks in the narrowband, and the subcarrier index value 6 identifies six consecutive physical resource blocks in the narrowband.

Manner three: in response to the physical resource block index value being 6, each of the subcarrier index values 0 to 2 identifies two consecutive physical resource blocks in the narrowband, each of the subcarrier index values 3 to 4 identifies three consecutive physical resource blocks in the narrowband, the subcarrier index value 5 identifies four consecutive physical resource blocks in the narrowband, and the subcarrier index value 6 identifies 6 consecutive physical resource blocks in the narrowband. In response to the physical resource block index value being 7, it is configured to be a reserved state.

Manner four: in response to the physical resource block index values being 6-7, they are configured to be a reserved state.

Manner five: in response to the physical resource block index value being 6, consecutive resource allocation in the narrowband is indicated through the number of time domain expansions of the subcarrier index and the uplink resource unit, where the allocated consecutive resource includes 1 to 6 physical resource blocks. In response to the physical resource block index value being 7, it is configured to be a reserved state.

Further, in the manner two, in response to the physical resource block index value being 6, the subcarrier index values 0 to 4 respectively identify: two consecutive physical resource blocks starting from physical resource block #0 in the narrowband, two consecutive physical resource blocks starting from physical resource block #1 in the narrowband, two consecutive physical resource blocks starting from physical resource block #2 in the narrowband, two consecutive physical resource blocks starting from physical resource block #3 in the narrowband, and two consecutive physical resource blocks starting from physical resource block #4 in the narrowband. The subcarrier index values 5 to 7 respectively identify: three consecutive physical resource blocks starting from physical resource block #0 in the narrowband, three consecutive physical resource blocks starting from physical resource block #1 in the narrowband, and three consecutive physical resource blocks starting from physical resource block #2 in the narrowband.

In response to the physical resource block index value being 7, the subcarrier index value 0 identifies three consecutive physical resource blocks starting from the physical resource block #3 in the narrowband; the subcarrier index values 1 to 3 respectively identify: four consecutive physical resource blocks starting from physical resource block #0 in the narrowband, four consecutive physical resource blocks starting from physical resource block #1 in the narrowband and four consecutive physical resource blocks starting from physical resource block #2 in the narrowband; the subcarrier index values 4 to 5 respectively identify: five consecutive physical resource blocks starting from physical resource block #0 in the narrowband and five consecutive physical resource blocks starting from physical resource block #1 in the narrowband; and the subcarrier index value 6 identifies six consecutive physical resource blocks starting from physical resource block #0 in the narrowband.

In the manner three, the subcarrier index values 0 to 2 respectively identify: two consecutive physical resource blocks starting from physical resource block #0 in the narrowband, two consecutive physical resource blocks starting from physical resource block #2 in the narrowband and two consecutive physical resource blocks starting from physical resource block #4 in the narrowband. The subcarrier index values 3 to 4 respectively identify: three consecutive physical resource blocks starting from physical resource block #0 in the narrowband and three consecutive physical resource blocks starting from physical resource block #3 in the narrowband. The subcarrier index value 5 identifies four consecutive physical resource blocks starting from the physical resource block #0 in the narrowband. The subcarrier index value 6 identifies six consecutive physical resource blocks starting from the physical resource block #0 in the narrowband.

In response to the physical resource block index values being 0 to 5, these physical resource block index values respectively identify physical resource blocks #0 to #5 in the narrowband as follows.

The subcarrier index values 0 to 3 respectively indicate: a 3-subcarrier resource unit whose start position is subcarrier #0, a 3-subcarrier resource unit whose start position is subcarrier #3, a 3-subcarrier resource unit whose start position is subcarrier #6 and a 3-subcarrier resource unit whose start position is subcarrier #9. The subcarrier index values 4 to 6 respectively indicate: a 6-subcarrier resource unit whose start position is subcarrier #0, a 6-subcarrier resource unit whose start position is subcarrier #3 and a 6-subcarrier resource unit whose start position is subcarrier #6. The subcarrier index value 7 indicates a full subcarrier resource unit whose start position is subcarrier #0.

Alternatively, the subcarrier index values 4 to 5 respectively indicate: a 6-subcarrier resource unit whose start position is subcarrier #0 and a 6-subcarrier resource unit whose start position is subcarrier #6, and the subcarrier index value 6 indicates a full subcarrier resource unit whose start position is subcarrier #0.

Optionally, in response to the uplink resource allocation parameter only indicating the subcarrier-level resource allocation in the physical resource block in transmission of the physical uplink shared channel of the terminal, the following is further included.

The uplink resource allocation parameter is indicated through at most $$\left\lceil \log_2\left(\left\lfloor \frac{N_{RB}^{UL}}{6} \right\rfloor\right) \right\rceil + 5 \text{ bits,}$$

or the uplink resource allocation parameter is indicated through $$\left\lceil \log_2\left(\left\lfloor \frac{N_{RB}^{UL}}{6} \right\rfloor\right) \right\rceil + 8 \text{ bits;}$$

where $N_{RB}^{UL}$ indicates the number of uplink physical resource blocks.

Specifically, indication through $$\left\lceil \log_2\left(\left\lfloor \frac{N_{RB}^{UL}}{6} \right\rfloor\right) \right\rceil + 5 \text{ bits}$$

is as follows.

In response to the uplink resource allocation parameter including the narrowband index, the physical resource block index and the subcarrier index, the narrowband index is indicated through $$\left\lceil \log_2\left(\left\lfloor \frac{N_{RB}^{UL}}{6} \right\rfloor\right) \right\rceil \text{ bits,}$$

and a combination of the physical resource block index and the subcarrier index is indicated through 5 bits. Alternatively, the narrowband index is indicated through $$\left\lceil \log_2\left(\left\lfloor \frac{N_{RB}^{UL}}{6} \right\rfloor\right) \right\rceil \text{ bits,}$$

the subcarrier index is indicated through 3 bits, and the physical resource block index is indicated through 2 bits.

Further, indicating the physical resource block through 2 bits includes: indicating the physical resource block through a predefined rule or in a predefined implicit mode.

The predefined rule includes: predefining part of the physical resource blocks in the narrowband to be used in the allocation mode having a smaller uplink resource allocation granularity, and indicating a certain physical resource block through 2 bits in the uplink resource allocation parameter.

The predefined implicit mode includes: determining a physical resource block range available for the allocation mode having a smaller uplink resource allocation granularity according to a resource position of control information transmitting the uplink resource allocation parameter.

The resource position includes, but is not limited to: a narrowband sequence number, a subframe number, a control channel element index and a candidate set index.

Optionally, indicating through $$\left\lceil \log_2\left(\left\lfloor \frac{N_{RB}^{UL}}{6} \right\rfloor\right)\right\rceil + 5 \text{ bits}$$

includes: the uplink resource allocation parameter including a resource indication value (RIV), where each RIV corresponds to the physical resource block index and the subcarrier index.

Specifically, the physical resource block index and the subcarrier index corresponding to each RIV are as follows.

RIV=the subcarrier index value+(the physical resource block index value−offset)×a total number of states of the subcarrier index; where the total number of states of the subcarrier index is six or seven.

$$\text{offset} = \left(\begin{array}{c}\text{a number of } PRBs \text{ in} \\ \text{a system bandwidth}\end{array} - \left\lfloor \frac{2^Y}{\text{the total number of states of the subcarrier index}} \right\rfloor\right)/2.$$

in the formula, PRB dents the physical resource block, and $$Y = \left\lceil \log_2\left(\left\lfloor \frac{N_{RB}^{UL}}{6} \right\rfloor\right)\right\rceil + 5.$$

Optionally, indicating the uplink resource allocation parameter through $$\left\lceil \log_2\left(\left\lfloor \frac{N_{RB}^{UL}}{6} \right\rfloor\right)\right\rceil + 8 \text{ bits}$$

includes: in response to the uplink resource allocation parameter including the narrowband index, the physical resource block index, the subcarrier index and the number of time domain expansions of the uplink resource unit, the narrowband index in the uplink resource allocation parameter is indicated through $$\left\lceil \log_2\left(\left\lfloor \frac{N_{RB}^{DL}}{6} \right\rfloor\right)\right\rceil \text{ bits,}$$

and the physical resource block index, the subcarrier index and the index value of the number of time domain expansions of the uplink resource unit are jointly indicated through 8-bit RIV.

Specifically, jointly indicating the physical resource block index, the subcarrier index and the index value of the number of time domain expansions of the uplink resource unit through 8-bit RIV includes:

RIV=the subcarrier index value+the physical resource block index value×the total number of states of the subcarrier index+the index value of the number of time domain expansions of the uplink resource unit×a total number of states of the physical resource block index×the total number of states of the subcarrier index;

or RIV=the physical resource block index value+the subcarrier index value×the total number of states of the subcarrier index+the index value of the number of time domain expansions of the uplink resource unit×the total number of states of the physical resource block index×the total number of states of the subcarrier index;

or RIV=the value of the number of time domain expansions of the uplink resource unit+the subcarrier index value×a total number of states of the number of time domain expansions of the uplink resource unit+the physical resource block index value×the total number of states of the number of time domain expansions of the uplink resource unit×the total number of states of the subcarrier index.

Optionally, the number of time domain expansions of the uplink resource unit is indicated through 3 bits, further included is: indicating the number of 3-subcarrier resource units and 6-subcarrier resource units in the time domain through the number of time domain expansions of the uplink resource unit.

The embodiment of the present disclosure is based on a joint encoding, makes full use of redundant state bits, and ensures to minimize the overhead on the basis of indicating all states.

Embodiment Seven

An embodiment of the present disclosure provides a computer-readable storage medium. The computer-readable storage medium stores a resource allocation program which, when executed by at least one processor, causes the at least one processor to execute steps of the resource allocation method in any one of embodiments one to five.

In the embodiment of the present disclosure, the computer-readable storage medium may be a random access memory (RAM), a flash, a read-only memory (ROM), an erasable programmable read-only memory (EPROM), an electrically erasable programmable read-only memory (EEPROM), a register, a hard disk, a mobile hard disk, a compact disc read-only memory (CD-ROM) or any other form of storage medium known in the art. A storage medium may be coupled to the processor, so that the processor is able to read information from, and write information to, the storage medium; or the storage medium may be a component of the processor. The processor and storage medium may be located in an application specific integrated circuit.

Although the present application describes a specific example of the present disclosure, those skilled in the art can design modifications of the present disclosure without departing from concepts based on the present disclosure. Various improvements may be made in the present disclosure by those skilled in the art without departing from the content of the present disclosure in light of the present disclosure, which still falls within the scope of the present disclosure.

INDUSTRIAL APPLICABILITY

The present disclosure is applicable to the field of communications for solving the problem in the related art that the resource allocation for the PUSCH can only be performed with a minimum resource allocation granularity of one physical resource block, and reduces the resource allocation granularity. Therefore, the MTC terminal can transmit the PUSCH with lager power, spectrum efficiency is further expanded, and coverage performance of the PUSCH of the MTC terminal is improved.

What is claimed is:

1. A resource allocation method, comprising:
configuring, through an uplink resource allocation parameter, resources for transmission of a physical uplink shared channel of a terminal; and
transmitting the uplink resource allocation parameter to the terminal, wherein the uplink resource allocation parameter comprises at least one of: a narrowband index, a physical resource block index, a subcarrier index or a number of an uplink resource units;
wherein configuring, through an uplink resource allocation parameter, resources for the transmission of the physical uplink shared channel of the terminal comprises:
in an allocation mode having a smaller uplink resource allocation granularity, indicating, through the uplink resource allocation parameter, a subcarrier-level resource allocation in a physical resource block and/or a physical-resource-block-level resource allocation in a narrowband in the transmission of the physical uplink shared channel of the terminal; wherein the allocation mode having a smaller uplink resource allocation granularity is an allocation mode whose resource allocation granularity is less than one physical resource block.

2. The method of claim 1, wherein configuring, through an uplink resource allocation parameter, resources for transmission of the physical uplink shared channel of the terminal at least comprises one of:
identifying narrowband position information of the configured resources through the narrowband index;
identifying information of a physical resource block of the configured resources through the physical resource block index; or
identifying a frequency domain subcarrier position of the uplink resource unit in the physical resource unit through the subcarrier index.

3. The method of claim 1, wherein each of the uplink resource units is at least one of:
a single subcarrier resource unit, a 2-subcarrier resource unit, a 3-subcarrier resource unit, a 4-subcarrier resource unit, a 6-subcarrier resource unit, a 9-subcarrier resource unit, or a full subcarrier resource unit.

4. The method of claim 1, further comprising: indicating each of the physical resource block index and the subcarrier index through 3 bits.

5. The method of claim 4, wherein indicating each of the physical resource block index and the subcarrier index through 3 bits comprises:
in response to the physical resource block index value being 0 to 5, the physical resource block index values respectively identify physical resource blocks #0 to #5 in the narrowband; in response to the physical resource block index values being 6 and 7, indication is in any one of the following manners:
manner one: in response to the physical resource block index value being 6, the physical resource block index value 6 identifies first 4 physical resource blocks in an allocated narrowband; in response to the physical resource block index values being 7, the physical resource block index value 7 identifies all 6 physical resource blocks in the allocated narrowband;
manner two: in response to the physical resource block index value being 6, each of subcarrier index values 0 to 4 identifies two consecutive physical resource blocks, each of subcarrier index values 5 to 7 identifies three consecutive physical resource blocks; in response to the physical resource block index value being 7, the subcarrier index value 0 identifies three consecutive physical resource blocks in the narrowband, each of the subcarrier index values 1 to 3 identifies four consecutive physical resource blocks in the narrowband, each of the subcarrier index values 4 to 5 identifies five consecutive physical resource blocks in the narrowband, and the subcarrier index value 6 identifies six consecutive physical resource blocks in the narrowband;
manner three: in response to the physical resource block index value being 6, each of the subcarrier index values 0 to 2 identifies two consecutive physical resource blocks in the narrowband, each of the subcarrier index values 3 to 4 identifies three consecutive physical resource blocks in the narrowband, the subcarrier index value 5 identifies four consecutive physical resource blocks in the narrowband, and the subcarrier index value 6 identifies six consecutive physical resource blocks in the narrowband;
or
manner five: in response to the physical resource block index value being 6, consecutive resource allocation in the narrowband is indicated through the subcarrier index and the number of the uplink resource unit, where the allocated consecutive resource includes 1 to 6 physical resource blocks.

6. The method of claim 5, wherein
in the manner two, in response to the physical resource block index value being 6, the subcarrier index values 0 to 4 respectfully identify: two consecutive physical resource blocks starting from the physical resource block #0 in the narrowband, two consecutive physical resource blocks starting from the physical resource block #1 in the narrowband, two consecutive physical resource blocks starting from the physical resource block #2 in the narrowband, two consecutive physical resource blocks starting from the physical resource block #3 in the narrowband, and two consecutive physical resource blocks starting from the physical resource block #4 in the narrowband, and the subcarrier index values 5 to 7 respectfully identify: three consecutive physical resource blocks starting from the physical resource block #0 in the narrowband, three consecutive physical resource blocks starting from the physical resource block #1 in the narrowband, and three consecutive physical resource blocks starting from the physical resource block #2 in the narrowband;
in response to the physical resource block index value being 7, the subcarrier index value 0 identifies three consecutive physical resource blocks starting from the physical resource block #3 in the narrowband, the subcarrier index values 1 to 3 respectfully identify: four consecutive physical resource blocks starting from the physical resource block #0 in the narrowband, four consecutive physical resource blocks starting from the physical resource block #1 in the narrowband, and four consecutive physical resource blocks starting from the physical resource block #2 in the narrowband, the subcarrier index values 4 to 5 respectfully identify: five consecutive physical resource blocks starting from the physical resource block #0 in the narrowband and five consecutive physical resource blocks starting from the physical resource block #1 in the narrowband, and the subcarrier index value 6 identifies six consecutive physical resource blocks starting from the physical resource block #0 in the narrowband;

in the manner three, the subcarrier index values 0 to 2 respectfully identify: two consecutive physical resource blocks starting from the physical resource block #0 in the narrowband, two consecutive physical resource blocks starting from the physical resource block #2 in the narrowband, and two consecutive physical resource blocks starting from the physical resource block #4 in the narrowband, the subcarrier index values 3 to 4 respectfully identify: three consecutive physical resource blocks starting from the physical resource block #0 in the narrowband and three consecutive physical resource blocks starting from the physical resource block #3 in the narrowband, the subcarrier index value 5 identifies four consecutive physical resource blocks starting from the physical resource block #0 in the narrowband, the subcarrier index value 6 identifies six consecutive physical resource blocks starting from the physical resource block #0 in the narrowband.

7. The method of claim 5, wherein in response to the physical resource block index value being 0 to 5, the physical resource block index values 0 to 5 respectively identifying physical resource blocks #0 to #5 in the narrowband comprises:

the subcarrier index values 0 to 3 respectively identify: a 3-subcarrier resource unit starting from the subcarrier #0, a 3-subcarrier resource unit starting from the subcarrier #3, a 3-subcarrier resource unit starting from the subcarrier #6, and a 3-subcarrier resource unit starting from the subcarrier #9; and the subcarrier index values 4 to 6 respectively identify: a 6-subcarrier resource unit starting from the subcarrier #0, a 6-subcarrier resource unit starting from the subcarrier #3, and a 6-subcarrier resource unit starting from the subcarrier #6, the subcarrier index value 7 identifies a full subcarrier resource unit starting from the subcarrier #0, or the subcarrier index values 4 and 5 respectively identify: a 6-subcarrier resource unit starting from the subcarrier #0 and a 6-subcarrier resource unit starting from the subcarrier #6, and the subcarrier index value 6 identifies: a full subcarrier resource unit starting from the subcarrier #0.

8. The method of claim 1, further comprising: indicating the number of the uplink resource unit through 2 bits or 3 bits.

9. The method of claim 1, wherein upon the uplink resource allocation parameter only indicating the subcarrier-level resource allocation in the transmission of the physical uplink shared channel of the terminal, the method further comprises:

indicating the uplink resource allocation parameter through at most $$\left\lceil \log_2\left(\left\lfloor \frac{N_{RB}^{UL}}{6} \right\rfloor\right) \right\rceil + 5 \text{ bits,}$$

or indicating the uplink resource allocation parameter through $$\left\lceil \log_2\left(\left\lfloor \frac{N_{RB}^{UL}}{6} \right\rfloor\right) \right\rceil + 8 \text{ bits;}$$

wherein $N_{RB}^{UL}$ denotes the number of uplink physical resource blocks.

10. The method of claim 9, wherein indicating the uplink resource allocation parameter through $$\left\lceil \log_2\left(\left\lfloor \frac{N_{RB}^{UL}}{6} \right\rfloor\right) \right\rceil + 5 \text{ bits}$$

comprises:

the uplink resource allocation parameter comprising the narrowband index, the physical resource block index and the subcarrier index, wherein the narrowband index is indicated through $$\left\lceil \log_2\left(\left\lfloor \frac{N_{RB}^{UL}}{6} \right\rfloor\right) \right\rceil \text{ bits,}$$

a combination of the physical resource block index and the subcarrier index is indicated through 5 bits; or the narrowband index is indicated through $$\left\lceil \log_2\left(\left\lfloor \frac{N_{RB}^{UL}}{6} \right\rfloor\right) \right\rceil \text{ bits,}$$

the subcarrier index is indicated through 3 bits and the physical resource block index is indicated through 2 bits.

11. The method of claim 10, wherein indicating the physical resource block index through 2 bits comprises:

indicating the physical resource block through a predefined rule or implicit mode;

wherein the predefined rule comprises: predefining part of physical resource blocks in the narrowband to be used in the allocation mode having a smaller uplink resource allocation granularity, indicating a certain physical resource block through 2 bits in the uplink resource allocation parameter; and the predefined implicit mode comprises: determining a physical resource block range available for the allocation mode having a smaller uplink resource allocation granularity according to a resource position of control information transmitting the uplink resource allocation parameter.

12. The method of claim 11, wherein the resource position includes, but is not limited to: a narrowband sequence number, a subframe number, a control channel element index and a candidate set index.

13. The method of claim 9, wherein indicating the uplink resource allocation parameter through $$\left\lceil \log_2\left(\left\lfloor \frac{N_{RB}^{UL}}{6} \right\rfloor\right)\right\rceil + 5 \text{ bits}$$

comprises:
the uplink resource allocation parameter comprising a resource indication value (RIV), wherein each RIV corresponds to the physical resource block index and the subcarrier index.

14. The method of claim 13, wherein each RIV corresponding to the physical resource block index and the subcarrier index comprises:
RIV=the subcarrier index value+(the physical resource block index value offset)×a total number of states of the subcarrier index; wherein
the total number of states of the subcarrier index is six or seven;

$$\text{offset} = \left(\begin{array}{c}\text{a number of PRBs in}\\ \text{a system bandwidth}\end{array} - \left\lfloor \frac{2^Y}{\text{the total number of states of the subcarrier index}} \right\rfloor\right)/2.$$

in the formula, PRB denotes the physical resource block;

$$Y = \left\lceil \log_2\left(\left\lfloor \frac{N_{RB}^{UL}}{6} \right\rfloor\right)\right\rceil + 5.$$

15. The method of claim 9, wherein indicating the uplink resource allocation parameter through $$\left\lceil \log_2\left(\left\lfloor \frac{N_{RB}^{UL}}{6} \right\rfloor\right)\right\rceil + 8 \text{ bits}$$

comprises:
in response to the uplink resource allocation parameter comprising the narrowband index, the physical resource block index, the subcarrier index and the number of the uplink resource unit, indicating the narrowband index in the uplink resource allocation parameter through $$\left\lceil \log_2\left(\left\lfloor \frac{N_{RB}^{DL}}{6} \right\rfloor\right)\right\rceil \text{ bits,}$$

jointly indicating the physical resource block index, the subcarrier index and an index value of the number of the uplink resource unit through 8-bit RIV.

16. The method of claim 15, wherein jointly indicating the physical resource block index, the subcarrier index and the index value of the number of the uplink resource unit through 8-bit RIV comprises:
RIV=the subcarrier index value+the physical resource block index value×the total number of states of the subcarrier index+the index value of the number of the uplink resource unit×a total number of states of the physical resource block index×the total number of states of the subcarrier index; or
RIV=the physical resource block index value+the subcarrier index value×the total number of states of the subcarrier index+the index value of the number of the uplink resource unit×the total number of states of the physical resource block index×the total number of states of the subcarrier index; or
RIV=the index value of the number of the uplink resource unit+the subcarrier index value×a total number of states of the number of the uplink resource unit+the physical resource block index value×the total number of states of the number of the uplink resource unit×the total number of states of the subcarrier index.

17. The method of claim 1, further comprising: indicating a number of 3-subcarrier resource units and 6-subcarrier resource units in the time domain through the number of the uplink resource unit.

18. A non-transitory computer-readable storage medium storing a resource allocation program, wherein, the resource allocation program, when executed by at least one processor, causes the at least one processor to execute the resource allocation method according to claim 1.

19. A resource allocation device, comprising: a memory and a processor, wherein the memory stores a resource allocation program, the processor executes the resource allocation program to implement:
configuring resources for transmission of a physical uplink shared channel of a terminal through an uplink resource allocation parameter; and
transmitting the uplink resource allocation parameter to the terminal, wherein the uplink resource allocation parameter comprises at least one of: a narrowband index, a physical resource block index, a subcarrier index, or a number of uplink resource units;
wherein the processor executes the resource allocation program to further implement:
in an allocation mode having a smaller uplink resource allocation granularity, indicating, through the uplink resource allocation parameter, a subcarrier-level resource allocation in a physical resource block and/or a physical-resource-block-level resource allocation in a narrowband in the transmission of the physical uplink shared channel of the terminal; wherein the allocation mode having a smaller uplink resource allocation granularity is an allocation mode whose resource allocation granularity is less than one physical resource block.

* * * * *